(12) United States Patent
Lehtimaki et al.

(10) Patent No.: US 6,208,961 B1
(45) Date of Patent: *Mar. 27, 2001

(54) APPARATUS FOR PREVENTING USE OF ERRONEOUS SPEECH ENCODING PARAMETERS FOR DECODING DIGITAL SPEECH TRANSMISSIONS

(75) Inventors: Matti Lehtimaki, Espoo; Marko Vänskä, Nummela, both of (FI)

(73) Assignee: Nokia Telecommunications Oy, Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/966,234

(22) Filed: Nov. 7, 1997

Related U.S. Application Data

(63) Continuation of application No. 08/379,584, filed on Mar. 20, 1995, which is a continuation of application No. PCT/FI94/00244, filed on Jun. 8, 1994.

(30) Foreign Application Priority Data

Jun. 10, 1993 (FI) .......................................................... 932664

(51) Int. Cl.[7] ..................................................... G10L 11/00
(52) U.S. Cl. .......................................... 704/226; 455/33.2
(58) Field of Search .................................... 704/200, 201, 704/226–228; 455/33.2; 379/59; 371/2.1, 31

(56) References Cited

U.S. PATENT DOCUMENTS

| | | | |
|---|---|---|---|
| 4,831,624 | * | 5/1989 | McLaughlin et al. ................. 371/31 |
| 5,042,082 | * | 8/1991 | Dahlin ................................ 455/33.2 |
| 5,097,507 | * | 3/1992 | Zinser et al. ......................... 704/226 |
| 5,146,609 | * | 9/1992 | Tayloe et al. ........................ 455/33.2 |
| 5,384,782 | * | 1/1995 | Elms ...................................... 371/2.1 |
| 5,442,681 | * | 8/1995 | Kotzin et al. ............................ 379/59 |

FOREIGN PATENT DOCUMENTS 0295226   12/1988   (EP) .

OTHER PUBLICATIONS

Abstracts of Japan, vol. 12, No. 244, E–631, Abstract of JP, A, 63–31328 ( Matsushita Electric Ind Co Ltd.), Oct. 2, 1988.

"European Digital Cellular Telecommunications System (Phase 2), Inband Control of Remote Transcoders and Rate Adaptors (GSM 08 60)", European Telecommunication Standard, European Telecommunications Standard Institute 1993, pp. 1–20.

Mouly et al., The GSM System of Mobile Communications, 1992, pp. 1–699.

* cited by examiner

*Primary Examiner*—David D. Knepper
(74) *Attorney, Agent, or Firm*—Pillsbury Madison LLP

(57) ABSTRACT

A speech signal is transmitted over a radio path by a mobile station, and is received in a first base station. The speech signal, encoded using encoding parameters, is forwarded in the information frames from the first base station to a remotely located speech decoder. Each of the information frames carries a synchronization word and a synchronization check bit recurring at predetermined intervals within the information frame. The information frames are received at the remote speech decoder. The remote speech decoder is synchronized with one of the received information frames using the synchronizing word. Speech encoding parameters are extracted from the received information frames, and the recurring synchronization check bit is monitored within the received information in order to detect an error in the recurring synchronization check bit in the received information frames.

10 Claims, 4 Drawing Sheets

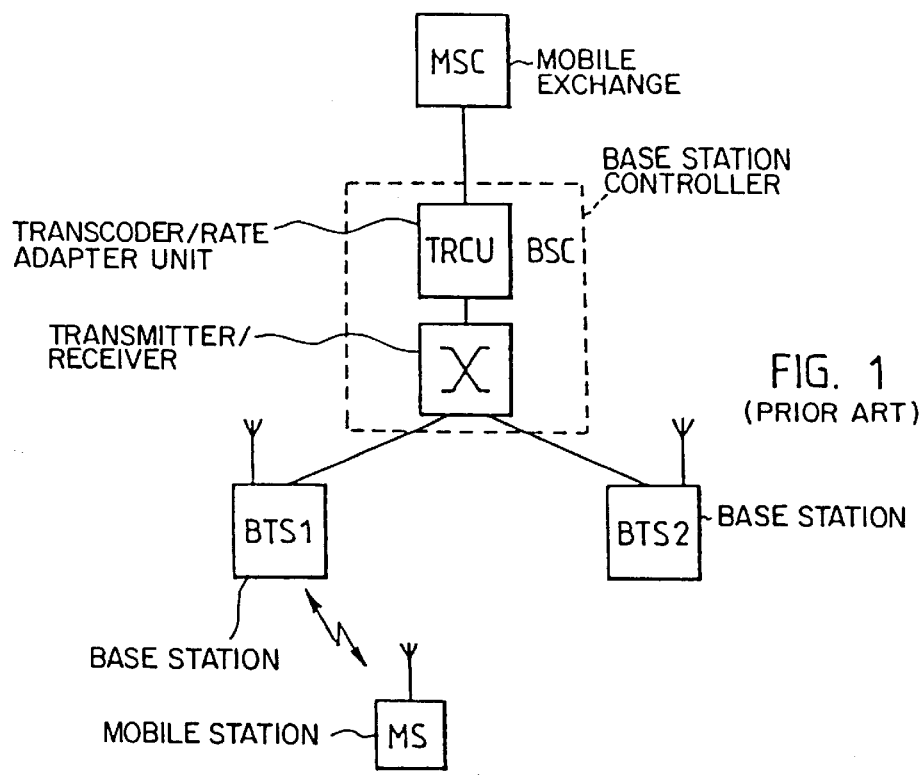
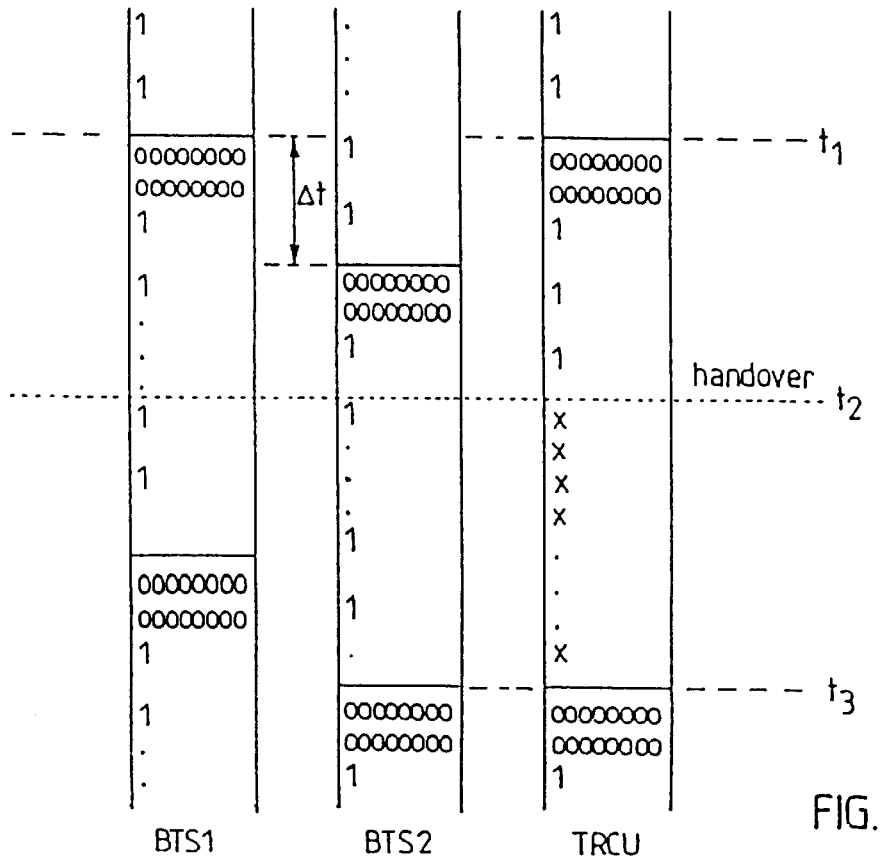

| OCTET NO. | BIT NUMBER | | | | | | | |
|---|---|---|---|---|---|---|---|---|
| | 1 | 2 | 3 | 4 | 5 | 6 | 7 | 8 |
| 0 | 0 | 0 | 0 | 0 | 0 | 0 | 0 | 0 |
| 1 | 0 | 0 | 0 | 0 | 0 | 0 | 0 | 0 |
| 2 | 1 | C1 | C2 | C3 | C4 | C5 | C6 | C7 |
| 3 | C8 | C9 | C10 | C11 | C12 | C13 | C14 | C15 |
| 4 | 1 | | | | | | | |
| 5 | | | LAR-PARAMETERS | | | | | |
| 6 | 1 | | 36 BITS | | | | | |
| 7 | | | | | | | | |
| 8 | 1 | | | | | | | |
| 9 | | | | | | | | |
| 10 | 1 | | I SUBFRAME | | | | | |
| 11 | | | | | | | | |
| 12 | | | LTP-RPE-PARAMETERS | | | | | |
| 13 | 1 | | 56 BITS | | | | | |
| 14 | | | | | | | | |
| 15 | | | | | | | | |
| 16 | 1 | | | | | | | |
| 17 | | | | | | | | |
| 18 | 1 | | II SUBFRAME | | | | | |
| 19 | | | | | | | | |
| 20 | | | LTB-RPE-PARAMETERS | | | | | |
| 21 | 1 | | 56 BITS | | | | | |
| 22 | | | | | | | | |
| 23 | | | | | | | | |
| 24 | 1 | | | | | | | |
| 25 | | | | | | | | |
| 26 | 1 | | III SUBFRAME | | | | | |
| 27 | | | | | | | | |
| 28 | | | LTB-RPE-PARAMETERS | | | | | |
| 29 | 1 | | 56 BITS | | | | | |
| 30 | | | | | | | | |
| 31 | 1 | | | | | | | |
| 32 | 1 | | | | | | | |
| 33 | | | IV SUBFRAME | | | | | |
| 34 | 1 | | | | | | | |
| 35 | | | LTB-RPE-PARAMETERS | | | | | |
| 36 | 1 | | 56 BITS | | | | | |
| 37 | | | | | | | | |
| 38 | 1 | | | | | | C16 | C17 |
| 39 | C18 | C18 | C20 | C21 | T1 | T2 | T3 | T4 |

FIG. 2
(PRIOR ART)

APPARATUS FOR PREVENTING USE OF ERRONEOUS SPEECH ENCODING PARAMETERS FOR DECODING DIGITAL SPEECH TRANSMISSIONS

This is a continuation of application Ser. No. 08/379,584, filed on Mar. 20, 1995, which was abandoned upon the filing hereof.

FIELD OF THE INVENTION

The invention relates to a speech decoding method, comprising the steps of receiving information frames containing speech encoding parameters, the first bits in each frame forming a synchronization word, and a synchronization check bit being thereafter repeated at regular intervals within the frame, synchronizing a speech decoder with the information frames received and extracting the speech encoding parameters from the information frames, storing the speech encoding parameters until the following information frame is received, decoding an encoded speech signal by means of the stored speech encoding parameters, monitoring the synchronization check bits to detect errors occurring within an information frame.

BACKGROUND OF THE INVENTION

The GSM (Global System for Mobile Communications) is a pan-European mobile phone system, which is becoming a world-wide standard. FIG. 1 shows the basic structural elements of the GSM system in a simplified manner without detailed description of their properties or the remaining parts of the system. A mobile exchange MSC switches incoming and outgoing calls. Most of its functions are similar to those of the exchange of a public switched telephone network. In addition to these normal functions, the mobile exchange also has functions typical of mobile communications, such as subscriber location management. Mobile stations (MS) are connected to the exchange (MSC) by means of base station systems. A base station system comprises a base station controller (BSC) and base stations (BTS). Each of the base station controllers is used for controlling a plurality of base stations. A BSC performs, for example, handovers in cases where the handover takes place between two base stations controlled by the same BSC.

The GSM system is entirely digital; even speech transmission is carried out entirely digitally. On account of the capacity restrictions of the radio path used, it is necessary to have an encoding method which is different from normal digital encoding methods and which takes into account the special features of speech; such a method is the RPE-LTP method (Regular Pulse Excitation-Long Term Prediction), which utilizes both long and short term prediction. The encoding produces LAR Logarithmic Area Ratio, RPE and LTP parameters for transmission.

In the network, various speech encoding and rate adaption functions have been concentrated in one transcoder unit TRCU (Transcoder/Rate Adaptor Unit). The TRCU may have several alternative locations in the system, depending on the choices made by the manufacturer. When the transcoder TRCU is positioned apart from the base station BTS, information is transmitted between the BTS and the TRCU in so-called TRAU frames of 320 bits, meaning that at a transmission rate of 16 kbit/s it takes 20 ms to transmit one frame. There are four different types of frames, classified by their information content: speech, use/maintenance and data frames, and so-called idle speech frames. To enable synchronization, the first two octets in each frame contain 16 synchronization bits. In addition, the first bit of the 16-bit words (two octets) that form a frame is a synchronization check bit. In addition to data bits containing actual speech, data or use/maintenance information, all frames comprise control bits C1–C21, which transmit information on the type of the frame and a varying amount of other frame type specific information. In both types of the speech frames the last four bits T1–T4 are reserved for timing alignment. FIG. 2 illustrates a speech frame according to GSM Recommendation 08.60, current edition as of Jun. 10, 1993, published by European Telecommunications Standards Institute, Sophia Antipolis, Valbonne, France. The data to be transmitted in the frame consists of speech encoding parameters. First there is a 36-bit group of LAR parameters. Then there are four subframes I, II, III and IV, each of which contains a 56-bit group of LTP-RPE parameters.

The interfaces of the transcoder are a 64 kbit/s PCM (Pulse Code Modulation) interface towards the mobile exchange MSC and a 16 kbit/s GSM interface towards the base station BTS. In connection with these interfaces the GSM recommendations also use the terms uplink and downlink direction: the uplink direction is the direction from the base station unit BTS towards the mobile exchange MSC, and the downlink direction is the reverse direction.

At the beginning of a call a transcoder TRCU is reserved for the call. Synchronization with the TRAU frames from the uplink direction is effected by means of the above-mentioned synchronization bits and synchronization check bits in such a manner that the actual synchronization with the frame takes place by means of the first 16 synchronization bits. The frame synchronization is effected continuously, and the time window used for monitoring is shifted according to possible changes in timing. The subsequent synchronization check bits in the frame are only used for detection of errors occurring within the frame. An error detected in the synchronization check bits does not call for action until in at least three consecutive erroneous TRAU frames are detected, in which case the level of the decoded speech is attenuated until synchronization is restored.

A handover between two base stations BTS can be performed either as an intra-BSC operation within a base station controller BSC using the same PCM line to the exchange or as an inter-BSC operation between base station controllers by changing the PCM line to the exchange. In the existing system, the base station controller BSC performs handovers within a base station controller by switching a new base station in place of the old base station at a random moment in relation to the TRAU frames transmitted by the new base station. This is illustrated in FIG. 3. The column on the left illustrates the TRAU frames transmitted by the old base station BTS1, the column in the middle illustrates the TRAU frames transmitted by the new base station BTS 2, and the column on the right illustrates the TRAU frames received by the transcoder. Base stations BTS1 and BTS2 are not synchronized with each other; the TRAU frames transmitted by them may thus have an arbitrary phase difference Δt. The transcoder TRCU is synchronized with the frame transmitted by the base station BTS1 at a point of time $t_1$, when receiving 16 synchronization bits "0" at the beginning of the frame. Thereafter it monitors synchronization bits "1", which regularly occur in the frame, and detects a proper synchronization operation. At a point of time $t_2$ the base station controller BSC performs a change of base station and switches the transcoder TRCU to a new base station BTS2 while the transcoder is receiving a TRAU frame, whereby the last frame transmitted by the old base station is interrupted. The frame which is transmitted by the new base station BTS2 and whose reception begins at a random point within the frame is attached to the original interrupted frame in the transcoder. The data contained at the end of the last frame whose transmission was started by the old base station BTS1 is thus useless. In the existing systems the transcoder TRCU does not, however, take this into account but decodes the "speech encoding parameters" included in this data. These parameters may have any values, wherefore an undue disturbing sound effect is produced amidst normal speech due to the handover. An error is usually detected in the synchronization check bits, but it does not call for action, as in the following frame, transmitted by the new base station BTS2, the synchronization will be restored.

SUMMARY OF THE INVENTION

An object of the present invention is to avoid the above-mentioned undue disturbing sound effect on a speech channel.

This is achieved with a speech decoding method as described in the foregoing field and background of the specification, characterized in that, in response to detection of an error within an information frame, updating of the stored speech encoding parameters is prevented until the reception of following information frame.

According to the invention, an error in the synchronization check bits is immediately taken into account in speech decoding by preventing the use of new useless speech encoding parameters for speech decoding and by using instead the stored speech encoding parameters of the previous frame. In addition, the parameter controlling the level of speech can be modified in such a manner that the level of decoded speech is attenuated to a zero level or by a predetermined attenuation coefficient.

The invention also relates to a speech decoder, comprising means for receiving information frames containing speech encoding parameters, the first bits in each frame forming a synchronization word, and a synchronization check bit being thereafter repeated at regular intervals within the frame, means for synchronizing the speech decoder with, the information frames received and for extracting the speech encoding parameters from the information frames, means for storing the speech encoding parameters until the reception of the following information frame, means for decoding an encoded speech signal by means of the stored speech encoding parameters, and means for monitoring the synchronization check bits to detect errors occurring within the information frame. The invention is characterized by the monitoring means being responsive to the detection of a synchronization error within the information frame for preventing the updating of speech encoding parameters stored in storing means until the following information frame, starting from the speech encoding parameters during the reception of which the synchronization error was detected.

The invention also relates to the use of a speech decoder in a cellular radio system for receiving information frames which are transmitted by a base station, the parameters being speech encoding parameters sent by a mobile station to the base station over a radio path, and the errors occurring within the frames being caused by a handover performed between base stations during a call.

BRIEF DESCRIPTION OF THE DRAWINGS

In the following, the invention will be described in more detail with reference to the accompanying drawings, in which:

FIG. 1 illustrates the basic elements of the GSM radio system,

FIG. 2 illustrates a TRAU speech frame according to GSM Recommendation 8.60,

FIG. 3 illustrates the effect of the handover on the transmission of TRAU frames.

PREFERRED EMBODIMENTS OF THE INVENTION

The basic structural elements of the GSM system as well as the TRAU speech frame are described in GSM recommendations. As for a more accurate description of the GSM system, reference is made to the GSM recommendations, published by European Telecommunications Standards Institute, current editions as of Jun. 10, 1993 and "The GSM System for Mobile Communications" by M. Mouly and M-B. Pautet, Palaiseau, France, 1992, ISBN: 2-9507190-0-7.

Figure 4:
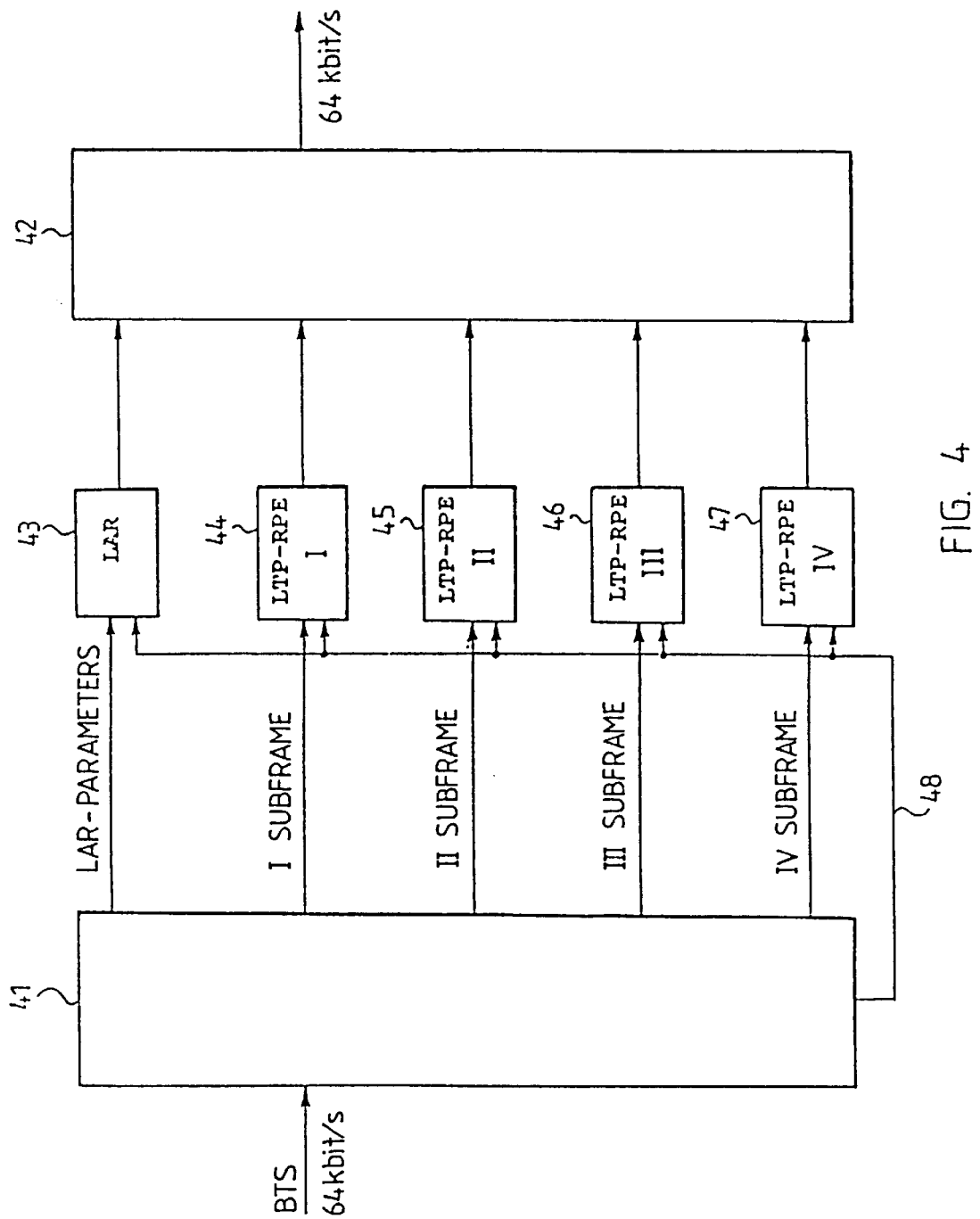
FIG. 4 is a general block diagram of the speech decoder according to the invention.
Figure 5:
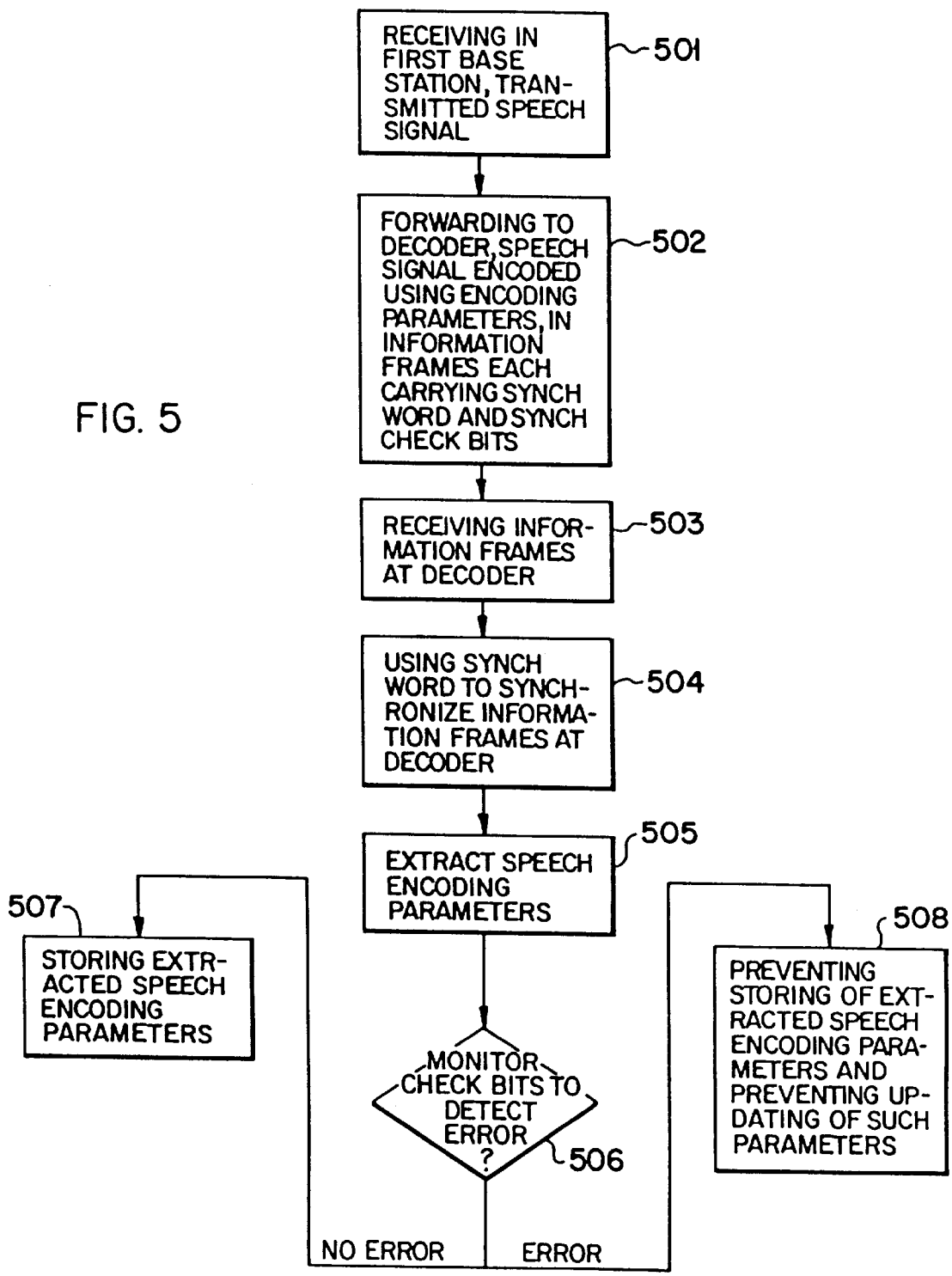
FIG. 5 is a flow diagram of the process of an embodiment of the invention.

FIG. 4 is a general block diagram of the speech decoder according to the invention. FIG. 5 is a flow diagram of the process of an embodiment of the invention. The speech decoder performs all the necessary operations pertaining to speech decoding and to the processing of TRAU frames. Transmission of speech is dealt with under chapter 06 in the GSM Recommendations, speech encoding particularly under 06.10. The following will only deal with the improvement which the invention provides in the operation according to the recommendations.

As described above with respect to FIGS. 1, 2 and 3, a base station receives a speech encoded speech signal from a mobile station MS, and transmits the speech encoding parameters further to the speech decoder in the TRCO unit by means of TRAU speech frames (blocks 501 and 502 in FIG. 5). In FIG. 4 a synchronization unit 41 (block 503 in FIG. 5) identifies the beginning of a TRAU speech frame received from a base station BTS on the basis of the 16 synchronization bits in state "0" at the beginning of the frame, and is synchronized with the frame by means of these synchronization bits (block 504 in FIG. 5). Thereafter the unit 41 (block 503 in FIG. 5) receives control bits C1–C15, a 36-bit group of LAR parameters, and four subframes I, II, III and IV, each of which contains a 56-bit group of LTP and RPE parameters.

During reception, the synchronization unit 41 checks (block 506 in FIG. 5) the 16-bit synchronization word at the beginning of the frame and thereafter that the first synchronization check bit of each received 16-bit word, i.e. the bit immediately following the first 16 synchronization bits and subsequently every sixteenth bit, is in logical state "1". If all the checked synchronization check bits are "ones", a proper synchronization and an error-free frame are assumed by the unit 41. In this case the frame error output 48 is in an inactive state. When the unit 41 detects that a synchronization check bit is in state "0", it interprets this as an error within the frame. As a result the frame error output 48 will be set to an active state for the rest of the frame. When the unit 41 receives 16 synchronization zeros again at the beginning of the following frame, the frame error output 48 is reset to an inactive state. Such an error within a frame usually occurs due to an intra-BSC handover, as illustrated in connection with FIG. 3.

The unit 41 extracts (block 506 in FIG. 5) LAR parameters from the frame and feeds them to a buffer memory 43 of LAR parameters. Correspondingly, the synchronization unit 41 extracts subframes I, II, III and IV, i.e. 56-bit groups of LTP and RPE parameters, from the received TRAU frame and supplies them to the buffer memories 44, 45, 46 and 47 of LTP-RPE parameters. Updating of parameters in the buffer memories 43, 44, 45, 46 and 47 is controlled by the frame error output 48 of the synchronization unit 41, the output being connected to the buffer memories. When the frame error output 48 (set in block 506 in FIG. 5) is in an inactive state, the LAR parameters and the LTP-RPE speech encoding parameters of the subframes I, II, III and IV are loaded to the buffer memories 43–47 as soon as they are received (block 507 in FIG. 5). From the buffer memories 43–47 the parameters are supplied to an LTP-RPE speech coder 42, which with the aid of the parameters decodes the encoded speech signal. Thus, upon receiving error-free TRAU frames, the parameters are stored in the buffer memories 43–47 until they are updated by the parameters of a new TRAU frame. If an error is detected within a received TRAU frame, the frame error output 48 is immediately set to an active state, as stated above (at block 506 in FIG. 5). The active frame error output 48 thus prevents the buffer memories 43–47 from being updated by the parameters of an erroneous TRAU frame (block 508 in FIG. 5), starting from the parameter group in which the error was first detected. With reference to FIG. 2, if, for instance, the first bit of octet 6 in a TRAU frame is detected to be zero, all parameters included in the frame are useless and buffer memories 43–47 are not updated at all by the parameters of this frame. Correspondingly, if it is not until in octet 34 of a TRAU frame that the first bit is detected to be zero, only subframe IV contains useless data; in this case, buffer memories 43–46 are updated normally, and the updating of buffer memory 47 is prevented. The buffer memories which are not updated contain the parameters of the preceding frame, which the decoder 42 then uses for decoding. As the parameters do not change, no undesired and disturbing sounds are produced to the speech signal as when useless parameters are used.

In an embodiment of the invention, the parameter XMAX which controls the level of speech is modified in the event of an error so that the level of the speech signal produced by the decoder 42 falls to zero level or by a predetermined attenuation coefficient. This is achieved in such a manner that when the frame error signal 48 is active, the parameter in question is read to the decoder 42 from a different location in the memory than in normal operation.

In view of the above, as depicted in FIG. 5, the speech decoding method of the present invention involves at a step 501 a first base station BTS1 receiving a speech signal from a mobile station MS. At 502, first base station BTS 1 forwards a speech signal which is encoded using encoding parameters, to a remote decoder which in the illustrated embodiment comprises a transcoder/rate adaptor unit TRAU, which forms part of a base station controller. The speech signal is forwarded to the TRAU, in information frames each carrying a synchronization word in first bits and a periodically recurring synchronization check bit. At 503, the information frames are received.

The TRAU comprises a decoder remote from the base stations, including the first base station BTS1 and the second base station BTS2. At 504, the decoder is synchronized with a received information frame utilizing the synchronizing word included in the information frame. At 505, the speech encoding parameters are extracted from the received information frames.

The synchronization check bits are monitored at 506 in order to detect an error in the received information frames.

At 507, the extracted speech encoding parameters are stored in the remote speech decoder for updating the speech parameters presently used for speech decoding, when no error is detected in the recurring synchronization check bit. On the other hand, at 508, the storing of the extracted speech encoding parameters in the remote speech decoder is prevented, and the updating of speech parameters presently used for speech decoding is also prevented, when an error is detected in the recurring synchronization check bit.

Even in other respects the invention has been. described above by way of example with reference to the GSM system. However, the invention is also suitable for use in other communications systems where speech encoding parameters are transmitted in data frames.

The figures and the associated description are intended merely to illustrate the present invention. In their details the method and decoder according to the invention may be modified within the scope of the appended claims.

What is claimed is:

1. A speech decoding method in a cellular radio network, comprising:

receiving in a first base station, a speech signal transmitted over a radio path by a mobile station, the speech signal including information frames encoded using encoding parameters;

forwarding said encoded information frames from said first base station to a speech decoder, the speech decoder being located further uplink and remote from said first base station, each of said information frames further carrying (i) a synchronization word in a first portion of the frame, and (ii) a synchronization check bit recurring at predetermined intervals within a remaining portion of the frame;

receiving said information frames at said remote speech decoder;

synchronizing said speech decoder with one of said received information frames using only a corresponding synchronizing word from the first portion of the frame;

extracting said speech encoding parameters from said one received information frame;

detecting errors in the remaining portion of the frame by monitoring for errors only in said recurring synchronization check bit, errors in the recurring synchronization check bit being indicative of errors in the remaining portion of the frame; and performing one of:
(i) storing the extracted speech encoding parameters in said remote speech decoder for updating speech parameters presently used for speech decoding, when no error is detected in said recurring synchronization check bit in said received information frame and
(ii) preventing the storing of the extracted speech encoding parameters in said remote speech decoder, and preventing updating of speech encoding parameters presently used for said speech decoding, when an error is detected in said recurring synchronization check bit in said received information frame.

2. The method according to claim 1, further comprising:

handing-off said mobile station from said first base station to a second base station during receiving said information frames, and thereby causing said error.

3. The method according to claim 1, wherein said preventing updating comprises:

preventing updating of speech encoding parameters presently used for said speech decoding starting with said speech encoding parameters being received when said error is detected; and allowing updating of speech encoding parameters presently used for said speech decoding using speech encoding parameters preceding when said error is detected.

4. The method according to claim 3, wherein said information frame includes four subframes, and wherein said preventing updating comprises:

preventing updating of speech encoding parameters presently used for said speech decoding starting with speech parameters in a subframe being received when said error is detected; and allowing updating of speech encoding parameters presently used for said speech decoding using speech encoding parameters in at least one subframe preceding when said error is detected.

5. The method according to claim 4, wherein:

each said received information frame contains LAR parameters of a RPE-LTP speech encoding algorithm and four subframes which respectively comprise first, second, third and fourth groups of RPE-LTP speech encoding parameters.

6. A cellular radio system, comprising:

a plurality of base stations;

a speech decoder located further uplink and remote from said base stations and arranged to serve said base stations;

a mobile station arranged for transmitting a signal containing information decodable as speech, to one of said base stations;

a corresponding one of said base stations which has received said signal being arranged to communicate to said remote speech decoder information frames carrying speech encoding parameters, a synchronization word in a first portion of each said information frame, and a synchronization check bit recurring at predetermined intervals within a remaining portion of each said information frame;

said remote speech decoder further comprising:

means for receiving said information frames from said corresponding one of said base stations;

means for synchronizing said remote speech decoder with a received one of said received information frames only by use of a corresponding said synchronizing word in the first portion of the frame;

means for extracting said speech encoding parameters from said received information frame in order to provide extracted speech encoding parameters;

means for detecting errors in the remaining portion of the frame by monitoring for errors only in the recurring synchronization check bit, errors in the recurring synchronization check bit being indicative of an errors in the remaining portion of the frame; and means for storing said extracted speech encoding parameters in said remote speech decoder in order to update speech parameters presently used in speech decoding, when no error is detected in said recurring synchronization check bit in said received information frames, and for preventing storing of said extracted speed encoding parameters in said remote speech decoder and for preventing the updating of speech parameters presently used in said speech decoding when an error is detected in said recurring synchronization check bit in said received information frames.

7. The cellular radio system of claim 6, wherein:

said error in said synchronization check bit is due to handing off said mobile station from one said base station to another said base station while receiving a corresponding one of said information frames.

8. The cellular radio system according to claim 6, wherein:

said remote speech decoder is arranged to prevent updating of speech encoding parameters being used for said speech decoding, starting from said speech encoding parameters received when said error is being detected in one of said information frames, and to allow updating of speech encoding parameters used for said speech decoding by using speech encoding parameters preceding when said error is detected in said one of said information frames.

9. The cellular radio system according to claim 8, wherein each said information frame comprises four subframes, and wherein:

said remote speech decoder is arranged to prevent updating of speech encoding parameters being used for said speech decoding, starting from speech encoding parameters in a subframe when said error is being detected in one of said information frames, and to allow updating of speech encoding parameters being used for said speech decoding by using speech encoding parameters in at least one subframe preceding when said error is detected in said one of said information frames.

10. The cellular radio system according to claim 9, wherein:

each respective one of said base stations is arranged when acting as said one of said base stations to provide that each said information frame contains LAR parameters of a RPE-LTP speech encoding algorithm and four subframes which respectively contain first, second, third and fourth groups of RPE-LTP speech encoding parameters.

* * * * *